No. 776,525. PATENTED DEC. 6, 1904.
W. C. LYNHAM & W. D. CREWS.
COMBINED SEED PLANTER AND FERTILIZER DISTRIBUTER.
APPLICATION FILED JULY 14, 1904.
NO MODEL. 2 SHEETS—SHEET 1.
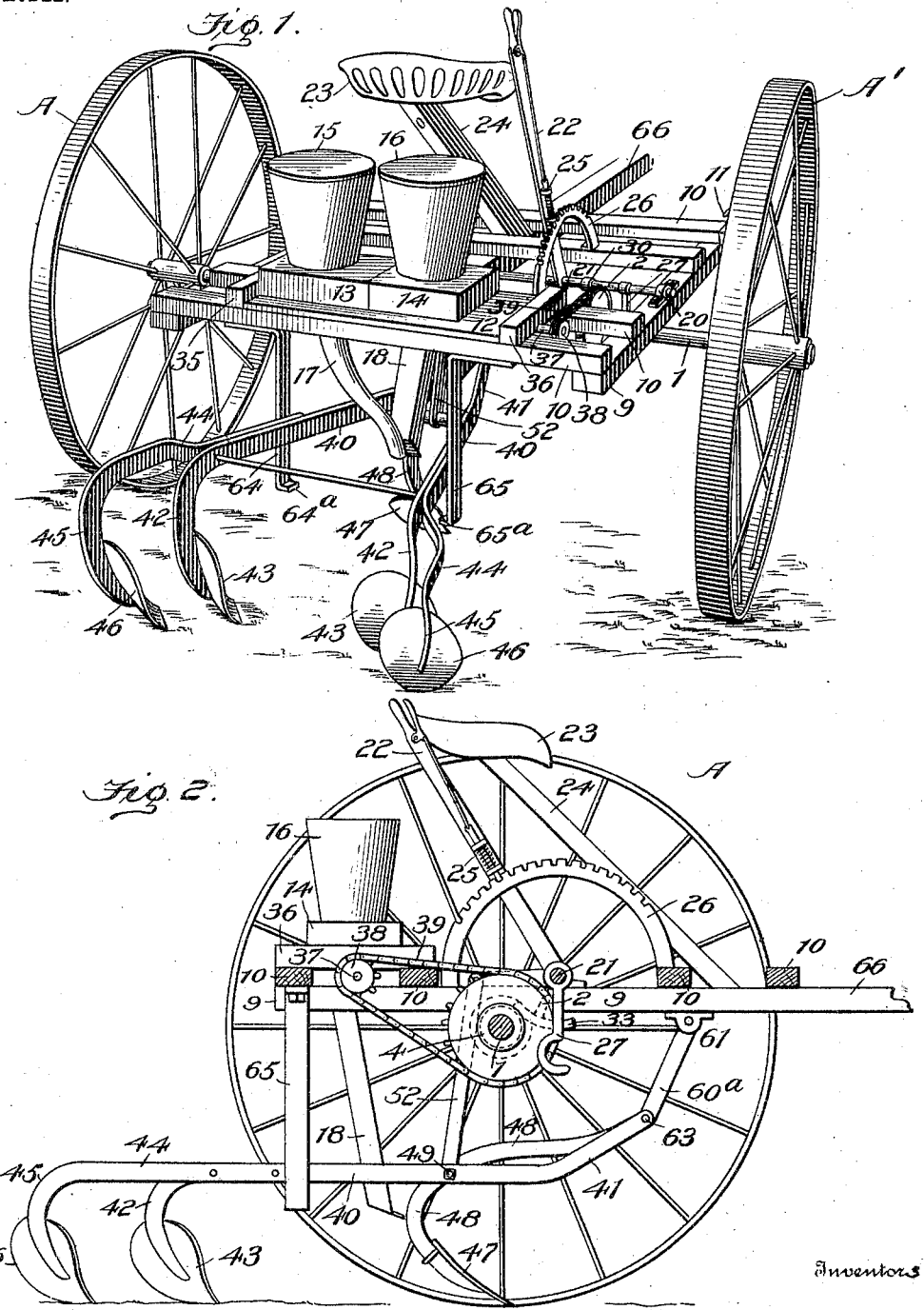
Witnesses
Edwin L. Bradford
Inventors
William C. Lynham
William D. Crews
By J. Granville Meyers
Attorney

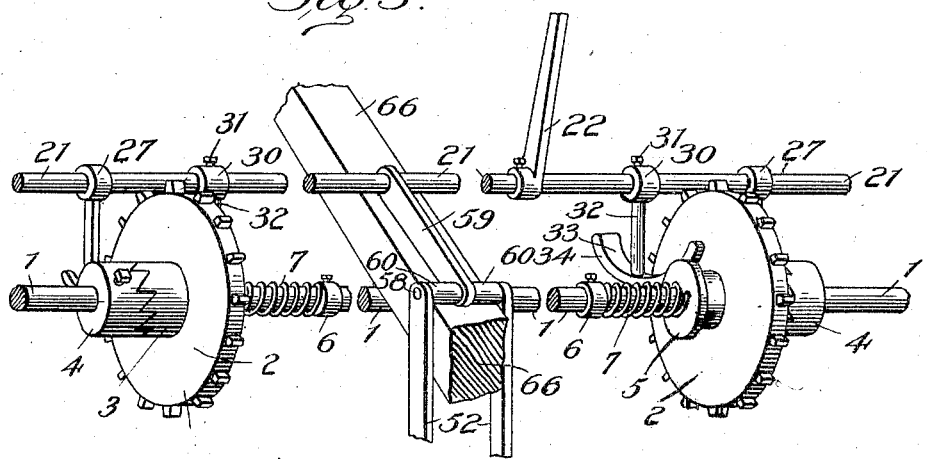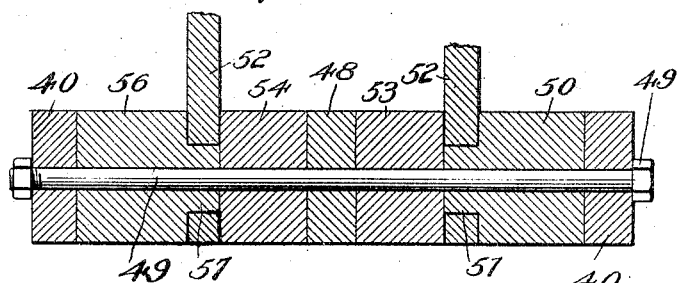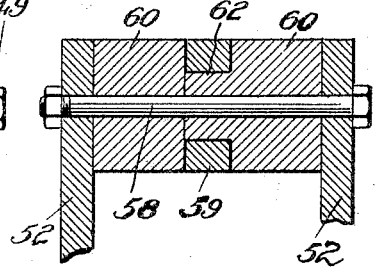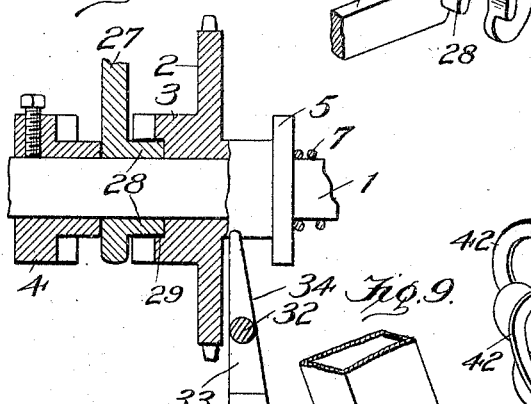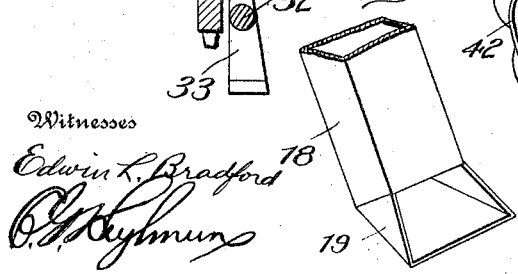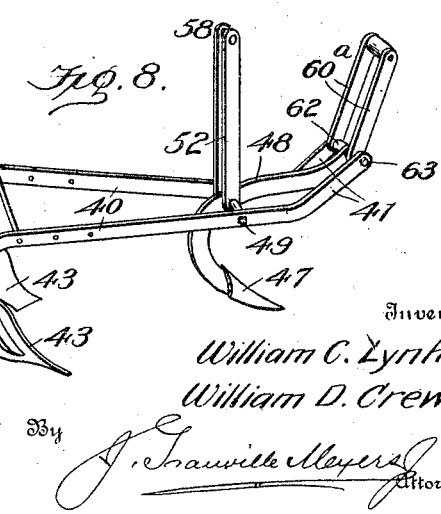

No. 776,525. Patented December 6, 1904.

UNITED STATES PATENT OFFICE.

WILLIAM CLIFFORD LYNHAM, OF RICHMOND, AND WILLIAM DAVID CREWS, OF CONCORD STATION, VIRGINIA.

COMBINED SEED-PLANTER AND FERTILIZER-DISTRIBUTER.

SPECIFICATION forming part of Letters Patent No. 776,525, dated December 6, 1904.

Application filed July 14, 1904. Serial No. 216,548. (No model.)

*To all whom it may concern:*

Be it known that we, WILLIAM CLIFFORD LYNHAM, residing at Richmond, in the county of Henrico, and WILLIAM DAVID CREWS, residing at Concord Station, county of Campbell, State of Virginia, citizens of the United States, have invented new and useful Improvements in a Combined Seed-Planter and Fertilizer-Distributer, of which the following is a specification.

Our invention relates to improvements in seeders and planters of that class or kind having means for making a furrow preliminary to receive the seeds, means for dropping the seeds, and means for covering the seeds and listing the furrow or row.

The objects are to provide an agricultural machine combining members of particular construction to accomplish in sequential order the steps of preparing a furrow, deposition of the seeds in the furrow, and covering the seeds and at the same time ridging or listing the row.

Another object is to provide such a machine with a seeding mechanism and a fertilizer-distributing mechanism acting independently of each other and which may act to deposit the materials simultaneously at the same point or act independently to deposit either the seeds or the fertilizer separately.

Other objects will be apparent in the course of the description and will be fully disclosed.

The invention resides in the novel construction of parts and their assemblage or aggroupment in operative combination, all as will be fully specified and the asserted novelty then particularly pointed out and distinctly claimed, as the statute directs.

We have fully and clearly illustrated the improvements in the annexed drawings, to be taken as a part of this specification and reference being had thereto.

Figure 1 is a perspective view of the complete machine as seen from the rear. Fig. 2 is a longitudinal central section through the frame and side view in elevation of the exposed parts. Fig. 3 is a detail perspective view of the main axle, showing the driving sprocket-wheels, the clutches, the rock-bar provided with clutch-shoes or cams for releasing the clutches, and the hooks for holding the clutches separated. Fig. 4 is a detail longitudinal vertical section taken through the union of the drag bars or beams and the lifting-link. Fig. 5 is a detail longitudinal section taken through the union of the upper ends of the lifting-link and the arm extending from the rock-shaft. Fig. 6 is a detail perspective view of the hook which engages between the clutches when they are separated. Fig. 7 is a detail longitudinal vertical section taken centrally through one of the driving-sprockets and the clutches, showing the latter as separated and the hook engaged between them, also indicating the clutch-shoe. Fig. 8 is a detail perspective view of the link system as applied to the drag-bars provided with single listing-plows, and Fig. 9 is a detail perspective view of the lower end of the fertilizer-distributing tube.

Referring to the drawings, A A' designate the wheels of the machine, mounted on an axle 1, the wheel A being mounted loose on the axle and the wheel A' being fixedly mounted thereon to turn the axle. On the axle are loosely and slidably arranged two driving sprocket-wheels 2 2, duplicates in construction, and the hubs of which are each formed at one end with a clutch member 3, adapted to engage with clutch members 4, fixed on the axle. The other end of the hubs are formed with an annular flange 5, so that an annular groove or way is formed between the flange and the wheel in which the curved shoe engages, as hereinafter more fully specified. On the axle 1 at suitable positions are fixedly secured collars 6, between which and the ends of the hubs is positioned an expansive spring 7, being of the spiral style and surrounding the axle and the force of which is constantly exerted to hold the clutch members in engagement.

On the axle 1 is mounted and carried a frame, preferably rectangular and of such size and area as will suit it to properly carry all the adjuncts and members mounted thereon. As illustrated, this frame is made up of substantial side rails 9, carried by the axle, and on these side rails are supported and secured the ends of cross-pieces 10, to the front one of which may be fixed hitching devices, as hooks 11, to which the swingletrees of the team can be connected. On the frame or platform thus constructed and made up is secured a floor 12, on which are mounted and secured the seed and fertilizer boxes 13 14, whereon are mounted hoppers 15 16, the former communicating with a seed-spout 17 and the latter discharging the fertilizer through a spout 18 and both delivering directly into the open furrow. The discharge end of the fertilizer-spout 18 is formed with a flaring shoe 19, the bottom of which is disposed at an incline approaching horizontally nearer than the body of the spout, so that the fertilizer will drop down on the incline or floor of the shoe and there be spread by the natural vibration of the spout and drop off the shoe properly distributed into the furrow. To permit the fertilizer to drop unimpeded through the spout it would fall in confined lines and areas; but by making the floor of the mouth of the fertilizer-spout at a less incline than the body thereof the fertilizer is scattered in the furrow, or when the machine is used as a fertilizer-distributer alone the material is scattered over the ridge and covered by the listing-plows. Any suitable mechanism may be employed for regulating the flow of seeds and the deposition of the fertilizer from the hoppers to the spouts, and since these devices form no part of our present improvements it is not deemed essential to illustrate and describe them.

On each side rail of the frame is mounted a bearing 20, (one only being shown,) and in these bearings is journaled a rock-shaft 21, positioned in advance of the axle, substantially as indicated, 22 designating a lever having its lower end fixed rigidly to the shaft 21 conveniently adjacent to the driver's seat 23, secured to a safe support 24, fixed at the front part of the frame. The lever 22 is provided with the usual spring-actuated pawl 25, engaging in the teeth of a section-rack 26, properly mounted and secured on the frame, substantially as indicated in the drawings. It will now be seen that by swinging the lever in either direction the shaft 21 will be correspondingly turned on its axis, and then by snapping the pawl into engagement with the section-rack the shaft will be locked against rotation until the lever is released.

On the rock-shaft 21 are loosely hung two hooks 27, suitably secured against lateral displacement and positioned to swing into the space which may be made between the members of the clutch when the movable member is slid away from the fixed member, and thus hold the members apart, as indicated in Fig. 7 of the drawings. On the side face of each hook 27 is formed a laterally-extending curved flange 28, which takes in an annular chamber 29, formed in the clutch ends of the movable members. The flange 28 is made slightly broader than the depth of the annular chamber, so that the ends of the clutch-teeth will not jam against the side of the hook. The opposite side face of the hooks is plain and smooth, so as to present as little friction as possible to the fixed members of the clutches. When the clutches are separated, the hooks are swung into the spaces between them by manipulation and remain in engagement until disengaged by the same process.

On the rock-shaft 21 are two sleeves 30, secured to the shaft by any suitable fastenings, as by set-screws 31, and having integrally depending therefrom arms 32, formed at their lower ends with segmental shoes 33, each having an inclined or cam edge 34, which bears against the inner face of one of the annular flanges 5 on the hub of the movable member of the clutches, as indicated in Fig. 3 of the drawings.

It will be perceived that the clutches of the driving-sprockets may be moved into and out of engagement and that either or both may be held out of engagement through the interposition of the hooks 27, so that both or either the seed-dropping mechanism or the fertilizer-distributing devices may remain idle. This is essential, because if both mechanisms are required in the work then both clutches must be in engagement to effect the purpose. If one only of the dropping or distributing devices is utilized, then the other is held idle by the interposition of the hook, and if the machine is used for listing or cultivating alone then the furrow-opener is removed and the listing-plows retained.

The floor 12 is supported at its longitudinal edges upon the two rear cross-pieces of the frame, and also supported at their end portions on the said cross-pieces are two short timbers 35 36, arranged, respectively, one at each end of the floor 12, and under the boxes 13 14 across the frame and journaled in suitable bearings (not shown) carried by the timbers 35 and 36 are two shafts 37 one only being indicated, (see Fig. 1,) disposed in end alinement and serving to operate the seeding and the fertilizer-distributing mechanism, respectively. On the outer end of each shaft is mounted a small sprocket-wheel 38, on which is arranged a chain 39, arranged on the driving sprocket-wheels, respectively.

The system of plows comprise drag bars or beams 40, having their forward end portions directed upward at an incline, as at 41, and their rear ends curved downward to form the plow-standards, as 42, to which are secured listing-plows 43, so positioned as to throw the dirt toward the row being planted and fertilized. To the rear portions of the drag-bars 40 are rigidly secured auxiliary beams 44, which are carried laterally outward, as shown, and then extending straight on a plane parallel with the beams 40, and their rear ends curved downward to form standards 45, to which are secured listing-plows 46, standing to the rear of and on an outer plane to the plows 43.

47 designates the plow for making the furrow into which the seeds and the fertilizer are deposited. The beam 48 of this plow is positioned centrally between the beams 40 and consists of a substantial metal bar, curved rearward and then forward with its end between the forward ends of the inclined portions 41 of the beams 40. At an intermediate point, as indicated, the several beams are clamped together by means of a bolt 49, the union being accomplished in the manner and by the means described, reference being had principally to Fig. 4 of the drawings, to wit: The bolt 49 may be projected through the several clamping members from either direction, and, proceeding from the right, it is passed through an aperture in the beam 40, and then by projecting the bolt farther there is arranged thereon a sleeve 50, formed with a circular boss 51. Then one limb of the lifting-link 52, having an aperture in its lower end, is arranged on the boss, and the bolt is projected through a counter-sleeve 53. Then the bolt is projected through the central beam 48 of the furrow-plow and passes through a sleeve 54. The other limb of the link is arranged in position, and a sleeve 56, formed with a boss 57, is disposed on the bolt with the boss in the aperture of the link, and the other plow-beam is arranged on the bolt. The bolt is then clamped up and the parts are held tight and secure in relative positions. In the arrangement shown the links 52 are disposed with their inner faces closely adjacent the side faces of the tongue, the arrangement being such as to strengthen and brace the entire structure and prevent the lateral movement of the front end of the plow structure. The limbs of the lifting-link 52 at their upper ends are connected by a bolt 58, on which is pivotally mounted the end of a lever 59, held against lateral displacement by sleeves 60, arranged on the bolt at each side of the lever, one of the sleeves 60 being formed with a bearing-boss 62, seated in the aperture of the end of the arm. The other end of the lever 59 is rigidly secured on the shaft 21, as indicated. The forward ends of the several beams are brought into alinement with the limbs of a link 60$^a$, pivotally secured between them and straddling the end of the furrow plow-beam. The upper end of the link 60$^a$ is pivotally hung in a bearing 61, secured to the frame. The lower ends of the limbs of the link 60$^a$ are formed with circular bosses 62 and are provided with bolt-apertures, as indicated in Fig. 5 of the drawings. A clamping-bolt 63 is projected through all the parts, and the bolt being tightened up all are held tight and secure in relative position. It will be seen that the beams 40 converge from their rear to the front ends and that the beam 48 is positioned centrally between them.

In Fig. 8 of the drawings the auxiliary listing-plows and their beams are dispensed with. In all other respects the construction is identical.

To the rear cross-bar of the frame are adjustably secured depending bars 64 65, which reach below the plow-beams 40 and lie against the outer faces to serve as guide-bars when the plows are lifted and also acts as stays to prevent lateral movement of the plows and take the torsional strain off the links and their connections. These bars are each formed at their lower extremities with inwardly-directed projections 64$^a$ 65$^a$, extending beneath the beams 40 and which serve to limit the downward movement of said beams and thereby prevent the listers from entering the ground too deeply.

It will readily be perceived that when it is desired to lift the plows from the ground all that is necessary to do is to actuate the lever 22 to accomplish the purpose. At the same time the plows are lifted the shoes 34 are brought into engagement with the hubs of the driving-sprockets and force the clutches apart, the seeding and the fertilizer-distributing mechanisms being thus made inactive. The hooks 27 may then be applied and the parts remain indefinitely inactive and inoperative. A suitable tongue 66 is secured to the frame in any well-known manner.

The operation of the respective parts and elements together with their functions have been stated in the course of the description; but the correlative action and combined operation may be stated as follows: It will be assumed that the plows have been lifted and the driving-sprockets loose and idle on the shaft, the clutches separated, and the hooks 27 engaged. If the purpose is to employ the full mechanism, the lever 22 is released, the hook 27 disengaged, the plows are let down, which action withdraws the clutch-shoes, and the hubs of the driving-sprockets, with the clutch members, are moved by the force of the springs 7 into engagement with the fixed clutch members, and the machine is ready for action. Should it be desired to cut out both the seeding and the fertilizer distributer, both clutches are separated and the hooks 27 applied. The machine may then be used for listing or for cultivating. Should it be desired to cut out either the seed or the fertilizer distributer and use but one of them, the clutch of the selected one is separated and the hook applied. The lever is then returned to permit the other clutch to engage, and the machine can proceed in the work with but one driving-sprocket active.

It may be stated that if the machine is used as a listing-plow or as a cultivator, the furrow-plow can be removed, and then the remaining plows will constitute a straddle-row machine.

The lever 22 and the lifting-link are utilized at the ends of the rows to lift the plows free from the ground while turning the machine around to prevent strain to the machine and also to throw the driving-sprockets loose on the axle and stop the flow of the seed and the fertilizer.

While we have shown the standards 42 and 45 provided with listing plows or shovels 43 46 to list the hill, we may, when desired, substitute revolving disk plows therefor for shovels of the type shown in Fig. 1 to attain the same result. When it is desired to throw down the list, the drag-bars 40 are removed from the machine and a single beam substituted therefor, the forward end of which may be hung to the lower ends of the links 60ª, said beam having the lifting-links 52 attached thereto at a point intermediate its ends, whereby the beam may be elevated similarly to the drag-bars 40. The single beam carries any suitably-constructed shovel which will effectually throw down the list.

It will be seen by referring to the drawings that the depending portion of each plow-beam or drag-bar is arranged on an arc of which a horizontal part of said beam forms the radii. Consequently on reaching the end of a row when it is desired to raise the plow points or blades out of the ground the construction described gives the following effect: The front and rear plow-points first move a little forward and upward, thereby loosening the soil, and when the lower end of the lifting-link 52 comes against the under part of the tongue it causes the points of the rear plows to move backward and upward in the arc of a circle. In operating the hand-lever 22 the forward plow-point is first lifted from the ground, pivoting first on the fixed end of the horizontal beam or tongue, and when it has been raised up to the full height a new fulcrum is brought into operation—namely, a point above the forward plow—thereby shortening the distance between the fulcrum and the rear plows. Then upon the further operation of the hand-lever the rear plows are now lifted from the ground, the forward one remaining raised. This manner of raising the plows has some decided advantages—namely, the amount of effort required to operate the lever is greatly lessened. Also the front plow may be raised and the rear plows left in the ground, which is an advantage in certain agricultural operations. Furthermore, it will be understood that by selecting different notches in the lever-quadrant 26 the plows may be set to work at any depth—that is, from full depth to merely scratching the ground.

Having thus described our invention, what we claim, and desire to secure by Letters Patent, is—

1. In a seeder and planter, the combination with the seeding mechanism, a driving-axle, and a clutch member fixed to the axle, of a driving sprocket-wheel loosely mounted on the axle and formed with a clutch member on its hub, means to disengage the clutch, and a hook to swing between the separated clutch members whereby to hold the seeding mechanism inoperative.

2. In a seeder and planter, the combination with the seeding mechanism, a driving-axle, and a clutch member fixed to the axle, of a driving sprocket-wheel loosely mounted on the axle and formed with a clutch member on its hub having an annular space between it and the axle, means to disengage the clutch members, and a hook formed with a curved lateral flange to engage between the separated clutch members with its lateral flange in the said annular space whereby to hold the seeding mechanism inoperative.

3. In a seeder and planter, the combination with the seeding mechanism, the driving-axle, and a clutch member fixed to the axle, a driving-sprocket loosely mounted on the axle and formed with a clutch member on the end of its hub, an expansive spring to hold the clutch members in engagement, means to separate the clutch members against the force of the spring, and a hook to engage the axle between the separated clutch members whereby to render the seeding mechanism inoperative.

4. The combination with a seeding mechanism, a driving-axle, a clutch member fixed on the axle, and a rock-shaft, of a driving sprocket-wheel loosely mounted on the axle, and formed with a clutch member on one end of its hub and an annular flange on the opposite end, an arm fixed on the rock-shaft and formed with a segmental shoe and having a cam edge to engage against the annular flange, means to rock the shaft and move the shoe against the flange to separate the clutch members, and a hook hung on the rock-shaft to engage between the separated clutch members and hold the seeding mechanism inoperative.

5. The combination with a seeding mechanism, a driving-axle, a clutch member fixed on the axle, and a rock-shaft, of a driving sprocket-wheel loose on the axle, having connection to the seed mechanism, and formed with a clutch member on one end of its hub, and an annular flange on the opposite end, an expansive spiral spring arranged on the axle to hold the clutch members in engagement, an arm fixed on the rock-shaft and formed with a shoe having a cam edge to engage against the annular flange, a lever to rock the shaft and move the shoe against the flange to separate the clutch members against the force of the spiral spring, and a hook hung on the rock-shaft to engage between the separated clutch members and hold the seeding mechanism inoperative.

6. In an implement of the character described, the combination with the wheeled frame and the rock-shaft having an arm secured thereto, of the plow-beams, a link freely suspended from the said frame and having a pivoted connection with the forward end of the plow-beams, and a lifting-link having a pivoted connection at one end with the plow-beams at a point in rear of the first-named link and at its other end with the arm on the rock-shaft, substantially as described.

7. The combination with the rock-shaft, and the frame, of an arm rigidly secured to the rock-shaft, a lifting-link pivotally secured to the end of the arm, the converging plow-beams of the listing-plows, the beam of the furrow-making plow located centrally between the converging plow-beams, said beams all secured to the lower end of the lifting-link, a link having its upper end pivotally secured to the frame and its lower end secured to a bolt projected through the ends of all the plow-beams.

8. The combination with the plow-beams and the lifting-link, of sleeves interposed between the limbs of the lifting-link and the central beams, sleeves interposed between the limbs of the lifting-link and the listing-plow beams, and a clamping-bolt projected through all the elements and parts.

9. The combination with the plow-beams and the lifting-link, of sleeves interposed between the limbs of the link and the central beam and formed with bosses extending into the apertures of the link, sleeves interposed between the limbs of the lifting-links and the listing-plow beams, said sleeves formed with central bosses to engage in the apertures of the link, and a clamping-bolt projected through all the elements and parts.

10. In an implement of the character described, the combination with the driving-axle and the seeding mechanism, of a rock-shaft and means for actuating the same, a driving connection between the axle and seeding mechanism, means on the rock-shaft for throwing the said driving connection out of operation, and separate means for holding it out of operation.

11. In an implement of the character described, the combination with the driving-axle and the seeding and fertilizing mechanisms, of a rock-shaft and means for actuating the same, separate driving connections between the axle and said seeding and fertilizing mechanisms, and means for throwing either of said mechanisms out of operation independent of the other.

12. In a seeding-machine, the combination with the seeding mechanism, the rock-shaft, and the plow-beam, of means connected to said rock-shaft for throwing the seeding mechanism out of operation, means also connecting the rock-shaft and plow-beams for raising the latter out of the ground, and means for holding the seeding mechanism against operation independent of the position of the plow-beams.

13. In a seeder and planter, a fertilizer-distributing spout consisting of a hollow stem, flaring side pieces at the end of the stem below the mouth thereof, and an inclined flaring floor between the side pieces onto which the material drops.

14. In an implement of the character described, the combination with the wheeled frame and the rock-shaft having an arm rigidly secured thereto, of the plow-beams each having an upwardly-extending front end and a downwardly-curved rear end, a link freely suspended from the said frame and having a pivoted connection with the said upwardly-extending ends of the plow-beams, and a lifting-link pivoted at one end to the arm on the rock-shaft and having a pivotal connection at its other end with the plow-beams in rear of the first-named link.

In testimony whereof we have hereunto set our hands in presence of two subscribing witnesses.

WILLIAM CLIFFORD LYNHAM.
WILLIAM DAVID CREWS.

Witnesses:
R. L. STAPLE,
W. H. STEELE.